(12) United States Patent
Carter et al.

(10) Patent No.: US 8,792,634 B2
(45) Date of Patent: Jul. 29, 2014

(54) METHOD AND SYSTEM FOR ADJUSTING LINE INTERFACE LEVEL TO COMPENSATE FOR INDUCED LOSS

(75) Inventors: Wade Carter, Snellville, GA (US); Rick Morris, Dacula, GA (US); Kristi Helton, Buford, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1678 days.

(21) Appl. No.: 11/356,228

(22) Filed: Feb. 16, 2006

(65) Prior Publication Data

US 2006/0182267 A1 Aug. 17, 2006

Related U.S. Application Data

(60) Provisional application No. 60/653,567, filed on Feb. 16, 2005.

(51) Int. Cl.
*H04M 1/00* (2006.01)

(52) U.S. Cl.
USPC .. 379/399.01; 379/400; 379/404; 379/390.01

(58) Field of Classification Search
USPC ............... 379/399.01–413.04, 142.01, 386, 379/93.28, 88.24, 390.01
See application file for complete search history.

(56) References Cited

U.S. PATENT DOCUMENTS

| 4,320,257 | A | * | 3/1982 | Warman | 379/202.01 |
|---|---|---|---|---|---|
| 6,014,441 | A | * | 1/2000 | Mark | 379/361 |
| 2003/0223432 | A1 | * | 12/2003 | Charania et al. | 370/395.52 |
| 2004/0028216 | A1 | * | 2/2004 | Freyman | 379/406.01 |
| 2005/0022247 | A1 | * | 1/2005 | Bitran et al. | 725/111 |

\* cited by examiner

*Primary Examiner* — Duc Nguyen
*Assistant Examiner* — Yosef K Laekemariam
(74) *Attorney, Agent, or Firm* — Troy A. Van Aacken

(57) ABSTRACT

An induced loss value is retrieved from a configuration file of an MTA device. The loss value is provided to a signal generator that generates call progress/alerting signals and FSK signals in the MTA telephony device. To mitigate the imbalance between incoming voice signal levels and call progress/alerting signals that may occur because the call progress/alerting signals are not generated at a level equal to that of the incoming voice signals, the loss/attenuation amount from the configuration file is used to adjust the levels of the generated call progress/alerting and FSK signals by a corresponding amount before they are attenuated along with the incoming voice signals.

18 Claims, 1 Drawing Sheet

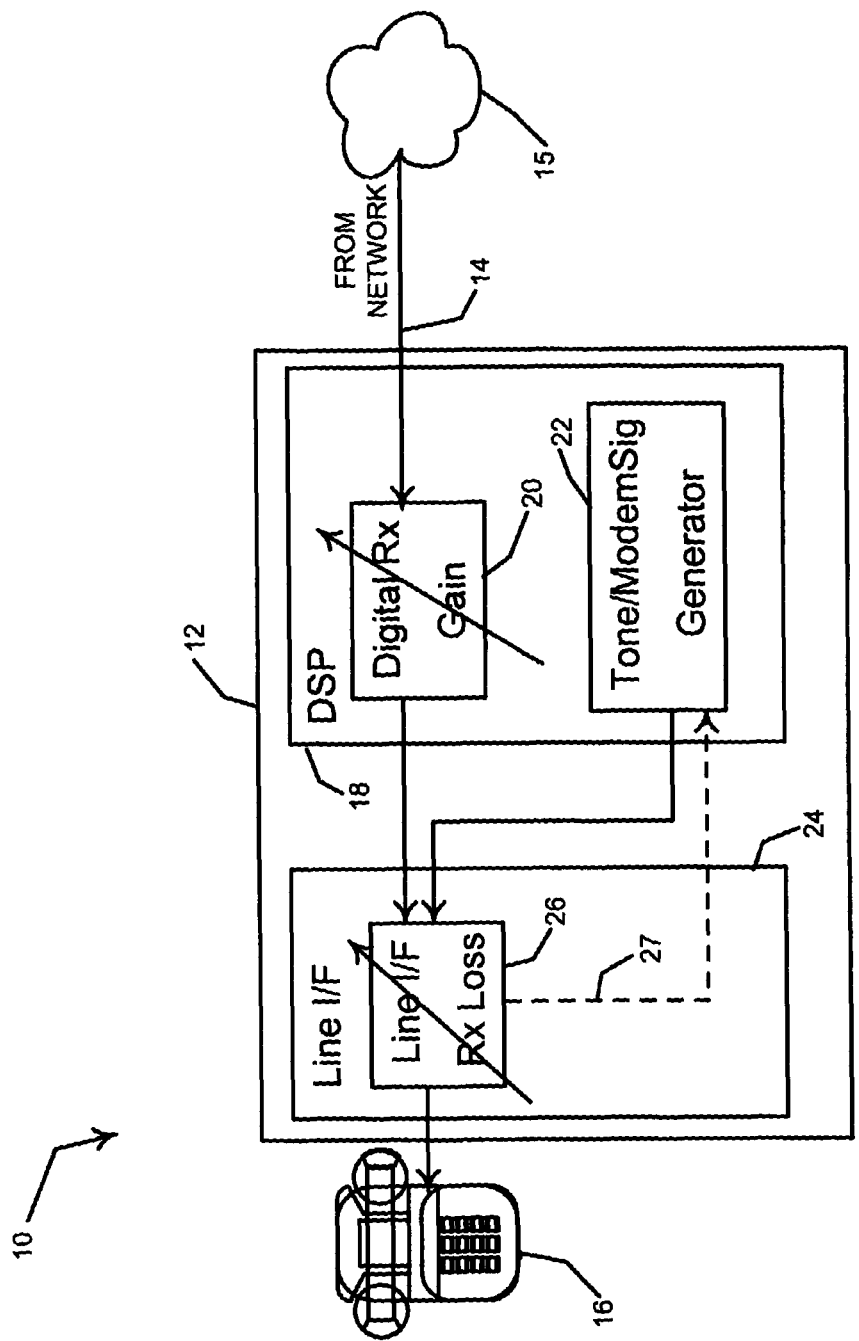

METHOD AND SYSTEM FOR ADJUSTING LINE INTERFACE LEVEL TO COMPENSATE FOR INDUCED LOSS

CROSS REFERENCE TO RELATED APPLICATION

This application claims priority under 35 U.S.C. 119(e) to U.S. provisional patent application No. 60/653,567 entitled "Gain-compensated tone/signal generation for telephony embedded multimedia adaptors," which was filed Feb. 16, 2005, and is incorporated herein by reference in its entirety.

FIELD OF THE INVENTION

This invention relates, generally, to communication networks and devices and, more particularly, to balancing network signals and generated signals at a line interface device.

BACKGROUND

Data-Over-Cable Service Interface Specifications ("DOCSIS") has been established by cable television network operators to facilitate transporting data traffic, primarily internet traffic, over existing community antenna television ("CATV") networks. In addition to transporting data traffic as well as television content signals over a CATV network, multiple services operators ("MSO") also use their CATV network infrastructure for carrying voice, video on demand ("VoD") and video conferencing traffic signals, among other types.

An MSO may use what is known in the art as PacketCable for providing telephony services to users. PacketCable™, which is a trademark of CableLabs®, facilitates the presentation of a transparent interface to a user with respect to operation of the network. In other words, a user plugs a standard telephone into a user device, which presents to the telephone what appears to be a traditional plain old telephony service ("POTS") line card interface. However, the user device transforms analog POTS signals to and from the telephone from/to internet packets.

Such a user device typically includes a media terminal adaptor ("MTA") that performs processing of signals between the telephone and the network interface portions of the user device. When a user device, such as one containing an MTA, performs processing of telephony signals for transport over a network according to PacketCable, for example, signals from the MSO's network are typically attenuated for various reasons, including echo reduction, level equalization, interference with other device, etc.

However, each network is different, and different network operators may use equipment made by different vendors, thus making the desirable amount of attenuation at a given point in the network different from other points. One of the points that loss is induced is at the MTA user device. Accordingly, even when the equipment is identical, as may be the case when similar equipment is used in different countries, for example, the attenuation at one MTA user device may be different than at another identical MTA user device.

Although the difference between networks generally results in optimum performance with respect to signals received from the operators' networks, such as voice signals, other signals that may be generated at the MTA user device may not be provided to a telephone that is connected to the MTA user device at an optimum level.

This is because while the attenuation induced in the line interface portion of the MTA user device is determined based on optimizing the signal levels of network signals, other signals, such as call progress signal, are generally generated at a standard level that is not based on the actual line interface receive ("Rx") attenuation used in a given MTA device. Thus, although the voice signals received at a telephone may be acceptable to the user, other signals levels, including dial tone, call ring back, busy signal, may be too loud or soft in comparison to the actual voice signal. Therefore, merely adjusting the volume level on the telephone would not be an acceptable solution because if it is adjusted to provide desirable dial tone signal level, the actual voice signal received from a caller on the other end of a telephone call may be too soft or too loud. Moreover, certain features, such as, for example, caller ID and dial-up modem signaling, which signals are produced in the MTA device, may not operate properly if the induced attenuation is to great.

Accordingly, there is a need in the art for a method and system for adjusting the signal level of call progress signals to compensate for the amount the induced attenuation deviates from a nominal value.

BRIEF DESCRIPTION OF DRAWINGS

FIG. 1 illustrates a system for automatically compensating for an imbalance in call progress signal levels and network signal levels by using information in the configuration file of an MTA device.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Turning to FIG. 1, a system 10 is shown for using an MTA device, such as, for example, a TOUCHSTONE Telephony Modem as produced by ARRIS International, Inc., for interfacing network signals 14 received from a network 15, such as a hybrid fiber coaxial network ("HFC") operated by a multiple services operator, with a user device, such as, for example, a standard telephone 16. MTA device 12 typically includes a digital signal processor 18, which has a digital Rx gain adjustment component 20 and a tone/modem signal generator 22. The digital Rx gain component performs filtering and general processing functions/operations on the network signal 14 before the same is provided to line interface section 24. Before being output to telephone 16, typically via an RJ-11 telephone jack, line interface Rx loss component 26 typically induces a loss (attenuates) the signal received from digital gain component 14 to compensate for signal levels on network 15 that may have been boosted for noise/performance reasons, for example. It is noted that call progress signals from tone/modem signal generator 22 are also input to attenuator 26.

However, the signal from digital Rx gain component 20 is not immediately combined with call progress signals from generator 22. These signals are conventionally generated at a predetermined nominal level before both signals are attenuated by the same amount at loss component 26 and provided to telephone 16. Instead, a value corresponding to the amount of attenuation induced by interface loss component 26 is retrieved from the configuration file used by device 12. This value is then provided to tone/modem signal generator 22 so that the generator can adjust its output by a corresponding amount. This facilitates the providing of function signals like call waiting to telephone 16 at a level high enough to ensure that the associated function is operable, and to ensure that dial tone, busy signals, etc. are provided at a level that is about the same as the levels of the network signals 14 that are provided to telephone 16.

The providing of the attenuation amount of loss component 26 from the configuration file is shown via dashed line 27. The line is dashed to show that the attenuation amount is typically provided virtually rather than electrically. It will be appreciated that the configuration file may not be stored in the line interface loss component 26, but line 27 is shown connecting generator 22 to loss component 26 to indicate that the same value used to induce loss at the loss component is also used to generate signals at a level that compensates for the amount by which they will be attenuated at loss component 26.

Furthermore, it will be appreciated that line 27 could represent an electrical feedback signal that causes generator 22 to locally generate call progress signals/alerting signals (e.g., dial tone, busy tone, call waiting and audible ring back) and FSK signals (e.g., for caller ID and message waiting indicator) at levels that compensate for the attenuation induced by loss component 26.

However, in the preferred embodiment, line 27 represents the providing of a loss value provisioned into MTA device 12, the loss value being retrieved from the MTA device's configuration file. When the loss value from the MTA device's 12 configuration file is provided to generator 22, this loss value, or attenuation amount, is used by generator 22 to determine the level at which call progress signals/alerting signals and FSK signals, as discussed above, are provided to the input of IF loss component 26.

It will be appreciated that the configuration file will typically contain a value that corresponds to the network the device is used in. For example, if the device is used in MSO1's network the loss amount may be $loss_1$. Similarly, if the device is used in MSO2's network the desired loss value may be $loss_2$. It will be appreciated that the loss/attenuation values typically represent dB values.

Thus, regardless of the network in which MTA device 12 is used, the attenuation value may be retrieved from the configuration file being used by device 12, and that same value can be used as a basis for adjusting the output level of generator 22 a corresponding amount so that the call progress/alerting signals, FSK signals and network signals (typically voice signals) are relatively balanced to ensure operability of features, such as caller ID, and to provide a pleasing balance of the various signal levels to a user of device 16.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for compensating the levels of tone signals for line interface losses, comprising:
   retrieving a loss amount value from a configuration file, the loss value being associated with adjustments to the signaling information separately from adjustments applied to received voice information;
   adjusting the output level of a tone signal generator used to generate signaling information to set up and tear down telephonic calls, the adjusting being based on the loss amount value retrieved from the configuration file wherein adjusting the output level of a tone signal generator is performed separately of any adjustment of output level applied to received voice information;
   attenuating incoming call signaling and the adjusted output level of tone signals generated by the tone signal generator by an amount that corresponds to the loss amount value, wherein attenuation is applied to call signaling and the adjusted output level of tone signals separately of any attenuation applied to received voice information; and
   providing the attenuated incoming call signaling and attenuated output signals of the tone generator to a user device.

2. The method of claim 1 wherein the user device is a telephone.

3. The method of claim 1 wherein the tone signals include dial tone, busy tone, call waiting tone and audible call ring back tone.

4. The method of claim 1 wherein the tone signals include caller ID and message waiting signals.

5. The method of claim 1 wherein the tone signals include modem signals.

6. The method of claim 1 wherein the step of adjusting the output level of the tone signal generator includes increasing the output level of the tone signal generator.

7. A method for compensating the levels of tone signals generated m an MTA user device for induced line interface losses, comprising:
   retrieving a loss amount value from a configuration file that is used by the MTA device to compensate for induced line interface losses at a line interface;
   adjusting the output level of a tone signal generator used to generate signaling information for setting up and tearing down calls, the adjusting being based on the loss amount value retrieved from the configuration file wherein adjusting the output level of a tone signal generator is performed independently of any adjustment of output level applied to voice information;
   attenuating incoming call signaling and the adjusted output level of tone signals generated by the tone signal generator by an amount that corresponds to the loss amount value at a line interface loss component wherein attenuating incoming call signaling and the adjusted output level of tone signals is performed independently of any attenuation applied to voice information; and
   providing the attenuated incoming call signaling and attenuated output signals of the tone generator to a user device coupled to the line interface loss component.

8. The method of claim 7 wherein the user device is a telephone.

9. The method of claim 7 wherein the tone signals include dial tone, busy tone, call waiting tone and audible call ring back tone.

10. The method of claim 7 wherein the tone signals include caller ID and message waiting signals.

11. The method of claim 7 wherein the tone signals include modem signals.

12. The method of claim 7 wherein the step of adjusting the output level of the tone signal generator includes increasing the output level of the tone signal generator.

13. A system for compensating the levels of tone signals generated in an MTA user device for induced line interface losses, comprising:

means for retrieving a loss amount value from a configuration file that is used by the MTA device to compensate for the line interface losses at a line interface;

means for adjusting the output level of a tone signal generator used to generate signaling information for setting up and tearing down calls, the adjusting being based on the loss amount value retrieved from the configuration file wherein adjusting the output level of a tone signal generator is performed independently of any adjustment of output level applied to voice information;

means for attenuating incoming call signaling and the adjusted level of output signals generated by the tone signal generator by an amount that corresponds to the loss amount value at a line interface loss component wherein attenuating incoming call signaling and the adjusted output level of tone signals is performed independently of any attenuation applied to voice information; and means for providing the attenuated incoming call signaling and attenuated output signals of the tone generator to a user device coupled to the line interface loss component.

14. The system of claim 13 wherein the user device is a telephone.

15. The system of claim 13 wherein the tone signals include dial tone, busy tone, call waiting tone and audible call ring back tone.

16. The system of claim 13 wherein the tone signals include caller ID and message waiting signals.

17. The system of claim 13 wherein the tone signals include modem signals.

18. The system of claim 13 wherein the step of adjusting the output level of the tone signal generator includes increasing the output level of the tone signal generator.

* * * * *